US000001029H

United States Statutory Invention Registration [19]

[11] Reg. Number: H1029

[43] Published: Mar. 3, 1992

Reinhart

[54] PARTICULATE ADDITIVES TO INCREASE THE MODULUS OF THERMOPLASTIC MATERIALS

[76] Inventor: Theodore J. Reinhart, 345 Forrer Blvd., Dayton, Ohio 45419

[21] Appl. No.: 376,280

[22] Filed: Jul. 5, 1989

[51] Int. Cl.[5] ..... C08K 7/02

[52] U.S. Cl. ..... 523/220

[58] Field of Search ..... 523/220, 221; 524/443, 524/493, 497, 441, 439

[56] References Cited

U.S. PATENT DOCUMENTS

| | | | |
|---|---|---|---|
| 3,889,039 | 6/1975 | Wainer | 523/220 |
| 3,951,906 | 4/1976 | Farber et al. | 523/220 |
| 3,966,669 | 6/1976 | Wolfe | 523/220 |
| 4,015,039 | 3/1977 | Segal et al. | 523/220 |
| 4,045,403 | 8/1977 | Lever et al. | 523/220 |
| 4,340,697 | 7/1982 | Aya et al. | 525/420 |
| 4,385,136 | 5/1983 | Ancker et al. | 523/215 |
| 4,444,806 | 4/1984 | Morgan et al. | 427/451 |
| 4,524,160 | 6/1985 | Maeda et al. | 523/221 |
| 4,529,757 | 7/1985 | Iseler et al. | 523/513 |
| 4,605,695 | 8/1986 | Sakamaki et al. | 524/443 |
| 4,610,808 | 9/1986 | Kleiner | 252/512 |
| 4,686,135 | 8/1987 | Obayaski et al. | 428/265 |
| 4,716,062 | 12/1987 | Klein | 524/439 |
| 4,778,716 | 10/1988 | Thorfinnson et al. | 428/236 |
| 4,822,660 | 4/1989 | Lipp | 428/113 |
| 4,826,927 | 5/1989 | Schmid et al. | 525/422 |
| 4,894,105 | 1/1990 | Dyksterhouse et al. | 264/136 |
| 4,957,801 | 9/1990 | Maranci et al. | 428/147 |

FOREIGN PATENT DOCUMENTS

| | | | |
|---|---|---|---|
| 3156854 | 6/1988 | Japan | 523/220 |

*Primary Examiner*—Robert L. Stoll
*Assistant Examiner*—Joseph D. Anthony
*Attorney, Agent, or Firm*—Fredric L. Sinder; Donald J. Singer

[57] ABSTRACT

Particulate additives for increasing the modulus of thermoplastic matrix materials used in making fiber reinforced composites is disclosed. Finely divided filler materials, such as silica, titania and silicon carbide, having particle sizes about 1 to 5 microns, is added to thermoplastic resin powder to increase the modulus properties, especially in compression, of the resulting matrix without materially changing any of the otherwise advantageous properties of the thermoplastic material.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PARTICULATE ADDITIVES TO INCREASE THE MODULUS OF THERMOPLASTIC MATERIALS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to matrix materials used in making fiber reinforced composite materials, and more specifically to particulate additives to thermoplastic matrix materials to increase the modulus of the matrix materials and provide greater stabilization of the fibers.

Advanced composites are high modulus (stiffness), high strength composite materials used in applications requiring high strength to weight ratios. They are typically made by embedding very high stiffness continuous fibers, such as glass, carbon or silicon carbide, into a polymer matrix, such as an epoxy or polyester resin. The term "continuous fibers" is understood to have its commonly understood meanings in the art of composite materials, particularly that of very long fibers, generally mutually aligned for enhanced strength along a particular axis, and not chopped or very short fibers generally randomly aligned. The fibers provide stiffness and strength to the composite material, but are brittle and highly sensitive to cracks and flaws. The matrix material absorbs energy and hinders the spread of small cracks. The presence of the matrix material allows a closer approach to using the theoretical maximum strength of the fibers in practical applications.

Thermosetting resins, such as epoxies and polyesters, take a permanent set when molded, and cannot thereafter be remolded. Thermoplastic resins, however, such as nylons, polycarbonates, acetals, polyethylenes, some polyesters, polysulfone and polyetheretherketone, become soft and pliable when heated and may be remolded without changing their physical properties. This property makes thermoplastic resins, when not used as a composite material matrix, very adaptable to low cost manufacturing methods such as injection molding and extrusion.

For use in advanced composites, polymer resins are generally impregnated into continuous reinforcing fibers to form preimpregnated fiber material (generally films or sheets), called prepregs, which are laid up in laminated plies and then cured under heat and pressure to make final structural shapes. Unlike composite structures fabricated by laminating prepregs made with thermosetting resins, the overall shape of composite structures fabricated from laminated prepregs made with thermoplastic resins can, under heat and pressure, be later reshaped and reformed. Moreover, processing of the prepregs themselves is easier with thermoplastic resins than with thermosetting resins.

Unfortunately, despite their advantages of lower cost and greater flexibility and ease of use in making composite structures, composites, especially advanced composites, made with thermoplastic resins are not as strong in compression as those made with thermosetting resins. While thermoplastic resins do promise better resistance against delaminating, their lower strength in compression makes composites made with thermoplastic matrix materials generally more susceptible to fiber microbuckling, kinking and shear band formation.

Thus it is seen that there is a need for methods for increasing the compression strength of thermoplastic matrix materials without significantly affecting their desirable mechanical properties and processing and fabrication advantages.

It is, therefore, a principal object of the present invention to provide a method for increasing the compression strength of thermoplastic matrix materials used in continuous fiber reinforced composite materials.

It is a feature of the present invention that the desirable mechanical properties of the thermoplastic matrix materials are not changed and the desirable processing and fabrication conditions remain the same.

These and other objects, features and advantages of the present invention will become apparent as the description of certain representative embodiments proceeds.

SUMMARY OF THE INVENTION

The present invention provides a method for improving the compression strength of thermoplastic matrix materials used in continuous fiber reinforced composite materials. The unique discovery of the present invention is that blending mineral or metallic powder (filler) with powdered thermoplastic resin material will produce a thermoplastic powder and filler blend that can be impregnated into continuous reinforcing fibers to produce a thermoplastic resin prepreg having the improved workability of thermoplastic resin advanced composites, compared to more conventional thermosetting resin prepregs, and also having much improved modulus properties (Young's and shear), especially in compression.

Accordingly, the present invention is directed to a blended powder of thermoplastic resin and filler, comprising a powdered thermoplastic resin, having particle sizes of about 1 to 5 microns and a filler, comprising a powder, selected from the group consisting of a metallic powder, a mineral powder, and a blend of metallic and mineral powders, having particle sizes of about 0.2 to 5 microns, in a percentage of about 1% to 20%, by weight, of filler to total blended powder.

The invention is also directed to a method for making a blended powder of thermoplastic resin and filler having, when made into a thermoplastic matrix material as part of a continuous fiber reinforced fiber composite material, increased modulus properties over the unblended thermoplastic resin, comprising the step of blending into a powdered thermoplastic resin, having particle sizes of about 1 to 5 microns, a filler comprising a powder, selected from the group consisting of a metallic powder, a mineral powder, and a blend of metallic and mineral powders, having particle sizes of about 0.2 to 5 microns, in a percentage of about 1% to 20%, by weight, of filler to total blended powder.

The invention is further directed to a method for making an improved continuous fiber reinforced composite material having a thermoplastic resin matrix, comprising the step of making the matrix using a blended powder of thermoplastic resin and filler comprising a powdered thermoplastic resin, having particle sizes of about 1 to 5 microns, and a filler, comprising a powder, selected from the group consisting of a metallic powder, a mineral powder, and a blend of metallic and mineral powders, having particle sizes of about 0.2 to 5 microns, in a percentage of about 1% to 20%, by weight, of filler to total blended powder.

DETAILED DESCRIPTION

The thermoplastic resins of the present invention are combined in powdered form with metallic or mineral filler powder to produce a filled thermoplastic resin powder that, when made into a matrix material for advanced composites, has improved modulus properties, especially in compression, over matrix materials made from unfilled thermoplastic resin powder.

Thermoplastic resin materials in powdered form are readily available in a variety of particle sizes. Adding finely divided powdered metallic and mineral fillers, preferably having particle sizes of about 0.2 to 5 microns, to thermoplastic resin powder, having particle sizes about 1 to 5 microns, in quantities from about 1 to 20 percent by weight increases the modulus, especially in compression, of the resulting processed thermoplastic material. The modulus increase does not materially change any of the otherwise advantageous processing properties of the thermoplastic material. And, when used to make thermoplastic matrix material for composite materials, typically through the intermediate step of making prepregs, the resulting modulus increase survives in the matrix material, thereby providing thermoplastic resin composites having increased resistance against microbuckling and similar weaknesses.

The filler materials may include silica ($SiO_2$), titania ($TiO_2$), silicon carbide (SiC) and a variety of other materials as will occur to those with skill in the art of the invention.

The disclosed invention successfully demonstrates the use of an additional reinforcing material in a matrix for continuous fiber reinforced composite materials, the additional reinforcing material serving a function related to, but different from that served by the continuous reinforcing material. Although the disclosed use is specialized, its teachings will find application in other areas where synergistic effects from the interaction of two components, as in advanced composites, can be extended by the addition of further synergistically acting components.

It is understood that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A continuous fiber reinforced composite material, comprising:
   (a) continuous reinforcing fibers; and,
   (b) impregnated into the continuous fibers, a blended powder of thermoplastic polymer resin and filler, comprising:
      (i) a powdered thermoplastic resin, having particle sizes of about 1 to 5 microns; and,
      (ii) a filler, comprising a powder, selected from the group consisting of a metallic powder, a mineral powder, and a blend of metallic and mineral powders, having particle sizes of about 0.2 to 5 microns, in a percentage of about 1% to 20%, by weight, of filler to total blended powder.

2. A method for making an improved continuous fiber reinforced composite material having a thermoplastic polymer resin matrix, comprising the steps of:
   (a) providing continuous reinforcing fibers; and,
   (b) impregnating into the continuous fibers, a matrix made using a blended powder of thermoplastic resin and filler comprising:
      (i) a powdered thermoplastic polymer resin, having particle sizes of about 1 to 5 microns; and,
      (ii) a filler, comprising a powder, selected from the group consisting of a metallic powder, a mineral powder, and a blend of metallic and mineral powders, having particle sizes of about 0.2 to 5 microns, in a percentage of about 1% to 20%, by weight, of filler to total blended powder.

* * * * *